US012771116B2

(12) United States Patent
Yang

(10) Patent No.: US 12,771,116 B2
(45) Date of Patent: Oct. 20, 2026

(54) ELECTRONIC CIRCUIT BREAKER CONFIGURED TO PROVIDE A FAIL-SAFE MODE

(71) Applicant: Siemens Industry, Inc., Alpharetta, GA (US)

(72) Inventor: Guang Yang, Johns Creek, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 297 days.

(21) Appl. No.: 18/609,657

(22) Filed: Mar. 19, 2024

(65) Prior Publication Data

US 2024/0222956 A1 Jul. 4, 2024

Related U.S. Application Data

(63) Continuation-in-part of application No. 17/662,384, filed on May 6, 2022, now abandoned.

(51) Int. Cl.

| | |
|---|---|
| ***H02H 5/04*** | (2006.01) |
| ***H02H 1/00*** | (2006.01) |
| ***H02H 3/20*** | (2006.01) |

(52) U.S. Cl.

CPC .......... *H02H 5/047* (2013.01); *H02H 1/0007* (2013.01); *H02H 3/20* (2013.01)

(58) Field of Classification Search

CPC ...... G01K 1/024; G01K 3/005; H02H 1/0007; H02H 1/0015; H02H 3/048; H02H 3/05; H02H 3/087; H02H 3/20; H02H 3/33; H02H 5/04; H02H 5/047; H02H 6/00; H02H 6/005; H02H 7/008; H02H 7/222; H02H 9/02; H02H 9/04; H02H 9/042; H03K 17/0822; H03K 2017/0806

See application file for complete search history.

(56) References Cited

U.S. PATENT DOCUMENTS 4,636,910 A * 1/1987 Chadwick .............. H02H 9/042 361/103
9,784,785 B2 * 10/2017 Farquhar, III ......... G01K 13/00
2025/0069837 A1 * 2/2025 Kinsel ................ G01R 31/3275
2025/0226650 A1 * 7/2025 Lu ........................... H02H 5/04

FOREIGN PATENT DOCUMENTS

FR 2873510 A1 * 1/2006 ............... H02H 7/24

* cited by examiner

*Primary Examiner* — Jeffrey A Gblende
*Assistant Examiner* — Nicolas Bellido

(57) ABSTRACT

An electronic circuit breaker is configured to provide a fail-safe mode. It comprises at least one overvoltage component, a temperature sensor attached to the at least one overvoltage component and a sensing and control circuit configured to monitor temperatures of the at least one overvoltage component. There are two criteria to decide if the electronic circuit breaker should open, when either criterion is met. The first criteria is if monitored temperatures exceed max safe temperature at any time and the second criteria is if the monitored temperatures increase at two different time moments during start up.

13 Claims, 6 Drawing Sheets

The method monitors temperature at different times to ensure it is the current leakage, not previous energy absorption

ELECTRONIC CIRCUIT BREAKER CONFIGURED TO PROVIDE A FAIL-SAFE MODE

CROSS REFERENCE TO RELATED APPLICATIONS

This Application is a Continuation-In-Part of U.S. patent application Ser. No. 17/662,384, filed May 6, 2022, entitled AN ELECTRONIC CIRCUIT BREAKER CONFIGURED TO PROVIDE A FAIL-SAFE MODE, which is incorporated by reference herein.

BACKGROUND

1. Field

Aspects of the present invention generally relate to an electronic circuit breaker configured to provide a fail-safe mode.

2. Description of the Related Art

Electronic components have become more common in circuit breakers, such as arc fault circuit interrupters (AFCIs), ground fault circuit interrupters (GFCIs), and recently solid-state circuit breakers. Although providing many advantages over traditional thermal magnetic circuit breakers, such as advance fault detection and short interruption times, electronic circuit breakers, especially the control circuits, are subject to damage from overvoltage events.

Overvoltage events are not evitable in circuit breaker applications as they can be generated in natural situations like lightning strikes. To protect electronic circuit breakers from overvoltage events, overvoltage protection components are used. The most common component is a Metal-Oxide Varistor (MOV). A MOV has the advantage of low cost and high energy absorption. However, MOVs degrade after repetitive usage and will lose their protection capabilities. It is necessary to ensure the circuit breakers stay in a safe mode, for example, at trip or off position, when MOVs lose their protection. A method needs to be provided to open circuit breakers when overvoltage components lose protection capabilities.

There are two ways to provide better protection up to date. First, the overvoltage components are normally oversized for the application to increase lifespan of the components. Second, when overvoltage components fail, leakage current causes heat in the components. The heat can be used to trigger certain mechanism to open circuit. However, both ways are inadequate.

Therefore, there is a need for a better overvoltage protection mechanism for an electronic circuit breaker.

SUMMARY

Briefly described, aspects of the present invention relate to an electronic circuit breaker configured to provide a fail-safe mode. A fail-safe mode in an electronic circuit breaker is defined as: if there is malfunction or if the electronic circuit breaker loses designed capabilities of protection, the electronic circuit breaker should cut off power to avoid hazards, such as fire and personal injuries. It is common among AFCIs, GFCIs devices and solid-state circuit breakers that an overvoltage protection component is used. Although there are many overvoltage protection methods, the most common one is clamping devices, such as Metal-Oxide Varistors (MOVs), a Transient Voltage Suppressor (TVS) and so on. Under overvoltage conditions, clamping devices can hold the voltage at the threshold voltage and absorb the excessive energies. MOVs are more often used for their lower cost and higher energy absorption. It is common that when clamping devices start to fail, leakage current occurs at lower voltages and eventually leads to the failure of the components. This invention is aimed to detect the leakage current of these components and hence leaves the circuit breakers in safe mode before component failure. The method monitors leakage current of clamping components. It has better accuracy and faster reaction time compared to the thermal approach. Also, for GFCIs, the primary differential current transformer (CT) can be used, no extra components are needed.

In accordance with one illustrative embodiment of the present invention, an electronic circuit breaker is configured to provide a fail-safe mode. It comprises at least one overvoltage component, a temperature sensor attached to the at least one overvoltage component and a sensing and control circuit configured to monitor temperatures of the at least one overvoltage component. There are two criteria to decide if the electronic circuit breaker should open, when either criterion is met. The first criteria is if monitored temperatures exceed max safe temperature at any time and the second criteria is if the monitored temperatures increase at two different time moments during start up.

In accordance with one illustrative embodiment of the present invention, a method of providing a fail-safe mode in an electronic circuit breaker. The method comprises providing at least one overvoltage component, providing a temperature sensor attached to the at least one overvoltage component and providing a sensing and control circuit configured to monitor temperatures of the at least one overvoltage component. There are two criteria to decide if the electronic circuit breaker should open, when either criterion is met. The first criteria is if monitored temperatures exceed max safe temperature at any time and the second criteria is if the monitored temperatures increase at two different time moments during start up.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
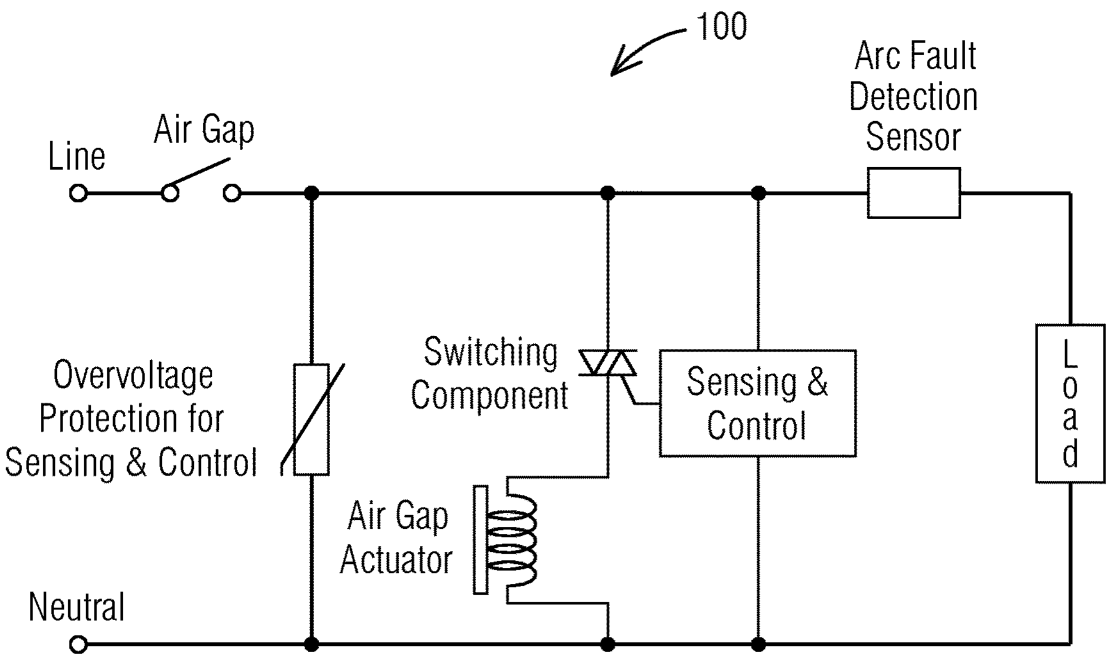
FIG. 1 illustrates an AFCI construction in accordance with an exemplary embodiment of the present invention.

Various technologies that pertain to systems and methods that facilitate overvoltage protection mechanism for an electronic circuit breaker will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of an electronic circuit breaker configured to provide a fail-safe mode. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the overvoltage protection mechanism for an electronic circuit breaker according to the present disclosure are described below with reference to FIGS. 1-8 herein. Like reference numerals used in the drawings identify similar or identical elements throughout the several views. The drawings are not necessarily drawn to scale.

Consistent with one embodiment of the present invention, FIG. 1 represents an AFCI construction 100 in accordance with an exemplary embodiment of the present invention. An arc-fault circuit interrupter (AFCI) is configured to detect a wide range of arcing electrical faults to help reduce an electrical system from being an ignition source of a fire.

Figure 2:
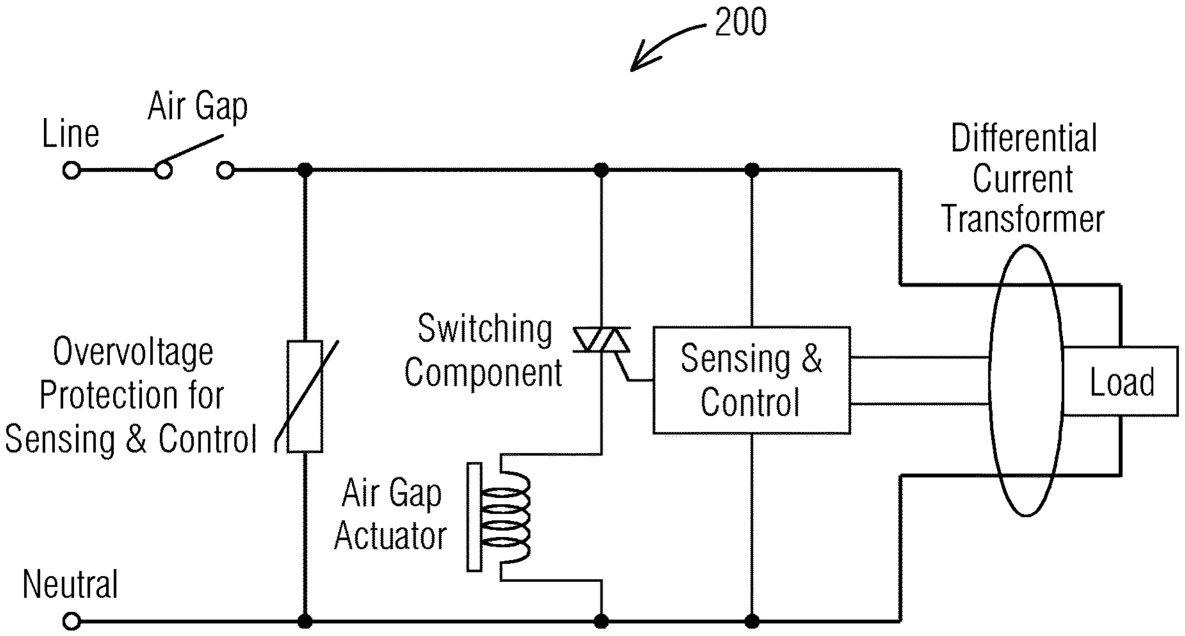
FIG. 2 illustrates a GFCI construction in accordance with an exemplary embodiment of the present invention.

Referring to FIG. 2, it illustrates a GFCI construction 200 in accordance with an exemplary embodiment of the present invention. A ground fault circuit interrupter (GFCI) is configured to shut off electric power in an event of a ground-fault.

Figure 3:
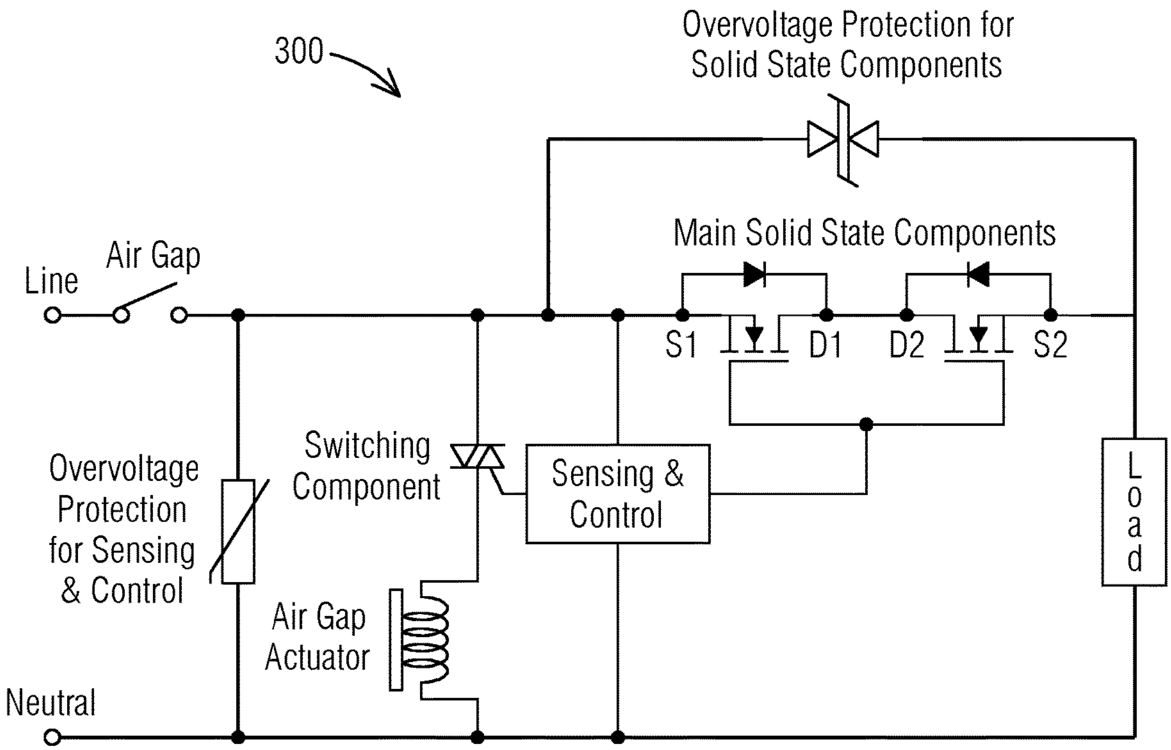
FIG. 3 illustrates a solid-state circuit breaker construction in accordance with an exemplary embodiment of the present invention.

Turning now to FIG. 3, it illustrates a solid-state circuit breaker construction 300 in accordance with an exemplary embodiment of the present invention. A solid-state circuit breaker (SSCB) replaces traditional moving parts of an electromechanical circuit breaker with semiconductors and advanced software algorithms that control power and can interrupt extreme currents faster.

FIGS. 1-3 show common structures of AFCIs, GFCIs and solid-state circuit breakers. It is common among these devices that an overvoltage protection component is used. Although there are many overvoltage protection methods, the most common one is clamping devices, such as MOVs, TVS and so on. Under overvoltage conditions, clamping devices can hold the voltage at the threshold voltage and absorb the excessive energies. MOVs are more often used for their lower cost and higher energy absorption. It is common that when clamping devices start to fail, leakage current occurs at lower voltages and eventually leads to the failure of the components. This invention is aimed to detect the leakage current of these components and hence leaves the circuit breakers in safe mode before component failure.

Figure 4:
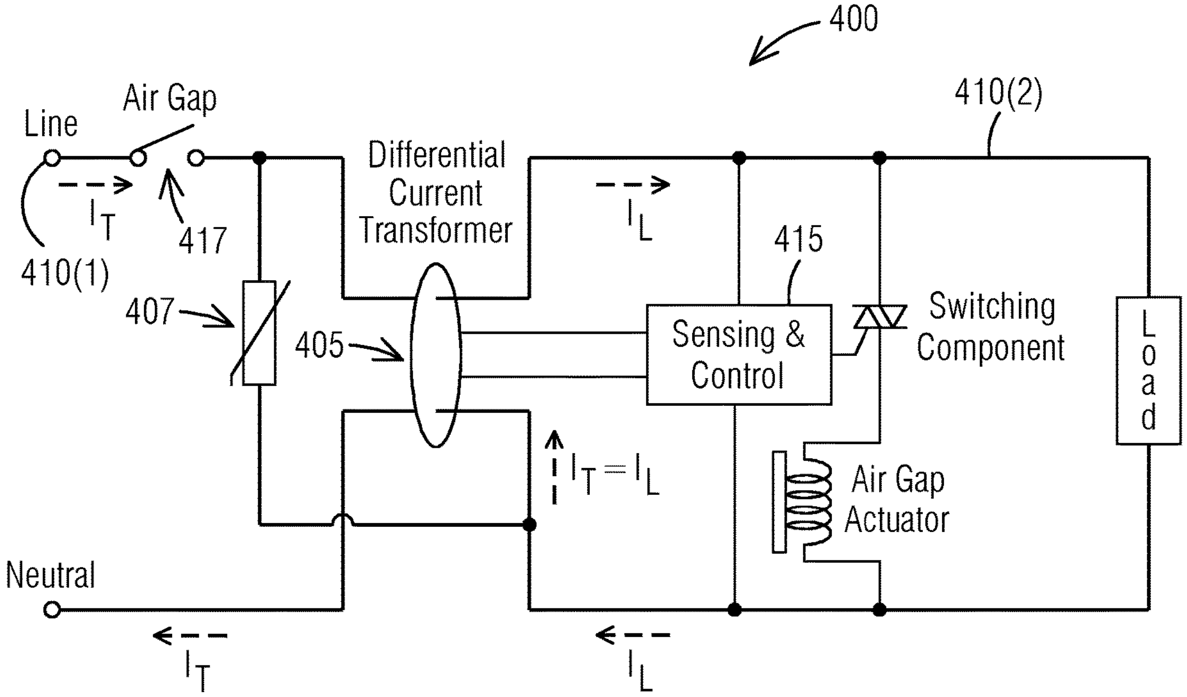
FIG. 4 illustrates a proposed GFCI construction with a rearranged overvoltage component connection-overvoltage component in good condition in accordance with an exemplary embodiment of the present invention.
Figure 5:
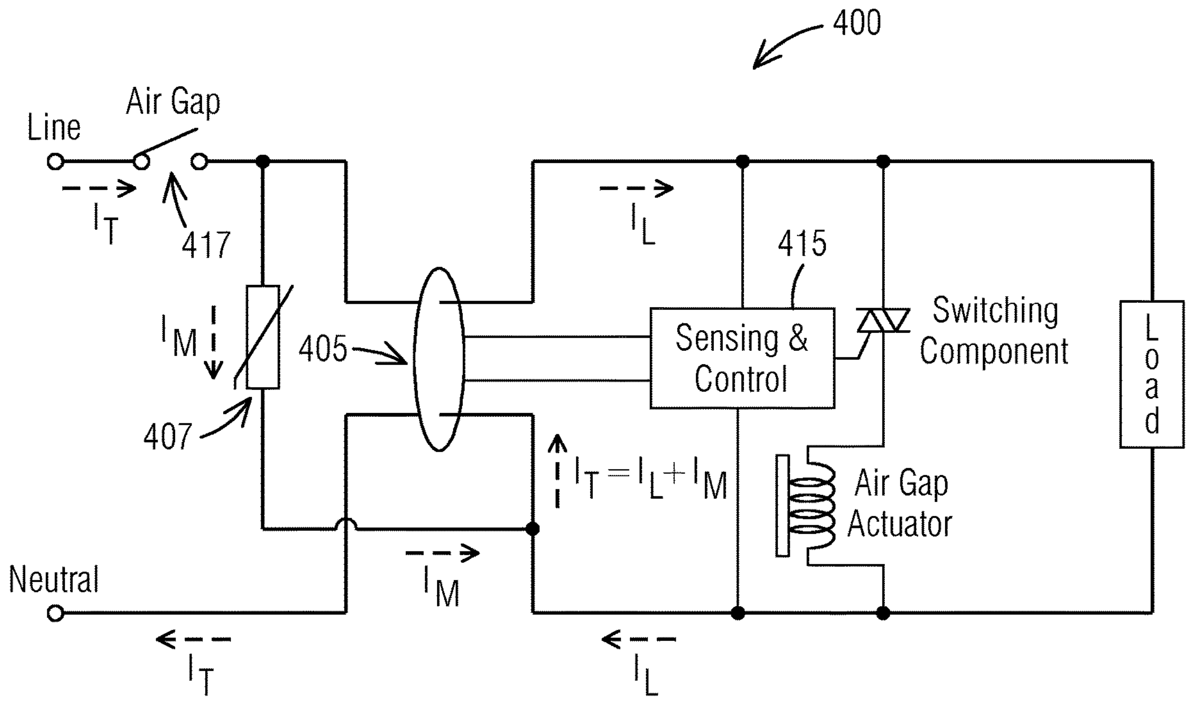
FIG. 5 illustrates a Proposed GFCI construction with a rearranged overvoltage component connection-overvoltage component starts to fail in accordance with an exemplary embodiment of the present invention.

FIG. 4 illustrates a proposed GFCI 400 with a rearranged overvoltage component connection-overvoltage component in good condition in accordance with an exemplary embodiment of the present invention. For GFCIs or other circuit breakers that already have differential current transformers, FIGS. 4-5 show the proposed structure. A same differential current transformer (CT) 405 used for ground fault detection can also be used for overvoltage component leakage current detection, with no extra components added. To achieve detection of leakage current, one side of a clamping device 407 is tapped on a line side 410(1) of the CT 405 and the other side is tapped on a load side 410(2) of the CT 405. When the clamping device 407 is in good condition, no leakage current occurs, so a total current, $I_T$, is equal to a load current, $I_L$. With a complete current loop, the CT 405 sees net zero current and will not trigger a sensing and control circuit 415 to open an air gap 417, as shown in FIG. 4. When the clamping device 407 is compromised, a leakage current, $I_M$, is present. As shown in FIG. 5, the CT 405 now sees net current of $I_M$, and can trigger the sensing and control circuit 415 to open the air gap 417 and leave the breaker 400 in a trip position. This method is convenient for GFCIs, since differential CTs are already present, and only rearrangement of wiring is needed. However, other types of electronic circuit breakers can also use the method by adding a differential CT or a current transformer directly on the clamping device current path to monitor leakage current.

An electronic circuit breaker such as the GFCI 400 is configured to provide a fail-safe mode. The GFCI 400 comprises an overvoltage protection device such as the clamping device 407. The overvoltage protection device may be a Metal-Oxide Varistor (MOV) or a Transient Voltage Suppressor (TVS).

The GFCI 400 further comprises the sensing and control circuit 415 configured to open the air gap 417. The GFCI 400 further comprises the differential current transformer (CT) 405 disposed directly on a current path of the overvoltage protection device 407 to monitor a leakage current and detect the leakage current of the overvoltage protection device 407 and hence leave the GFCI 400 in a safe mode before component failure. The differential current transformer 405 to see a net current of $I_M$, and trigger the sensing and control circuit 415 to open the air gap 417 and leave the GFCI 400 in a trip position.

The differential current transformer 405 is the same differential current transformer that is being used for ground fault detection and it can also be used for overvoltage component leakage current detection, with no extra components added. To achieve detection of the leakage current, one side of the overvoltage protection device 407 is tapped on a line side of the differential current transformer 405 and other side of the overvoltage protection device 407 is tapped on a load side of the differential current transformer 405. When the overvoltage protection device 407 is in a good condition, no leakage current occurs, so a total current, $I_T$, is equal to a load current, $I_L$ such that with a complete current loop, the differential current transformer 405 sees a net zero current and will not trigger the sensing and control circuit 415 to open the air gap 417.

As seen in FIG. 5, it illustrates the GFCI 400 with a rearranged overvoltage component connection-overvoltage component starts to fail in accordance with an exemplary embodiment of the present invention. When the overvoltage protection device 407 is compromised, the net current of $I_M$ as a leakage current, $I_M$, is present such that the differential current transformer now sees the net current of $I_M$, and triggers the sensing and control circuit 415 to open the air gap 417 and leave the GFCI 400 in a trip position. When the overvoltage protection device 407 starts to fail, the leakage current occurs at lower voltages and eventually leads to failure of components.

Figure 6:
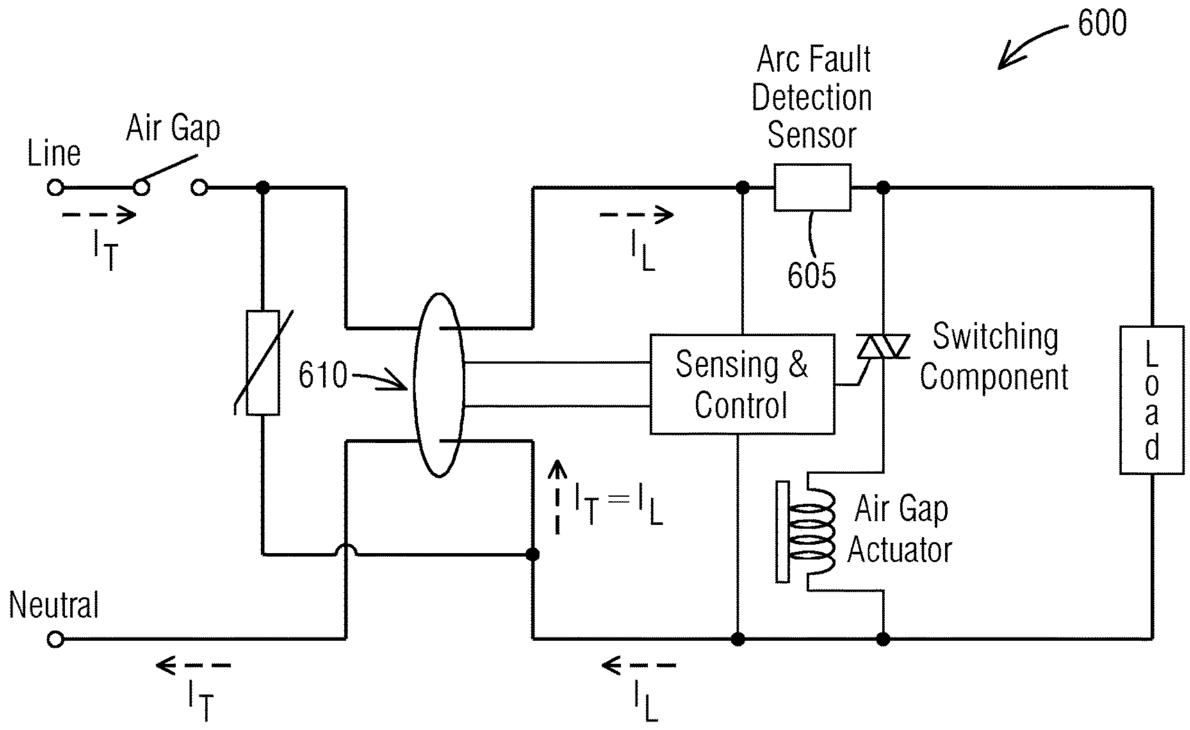
FIG. 6 illustrates a proposed AFCI construction in accordance with an exemplary embodiment of the present invention.

As shown in FIG. 6, it illustrates a AFCI 600 in accordance with an exemplary embodiment of the present invention. FIGS. 1-3 show that the basic structures of all three circuit breakers (AFCI, GFCI, Solid-State) are similar. For the AFCI 600, an arc fault detection sensor 605 is used to gather high frequency current information for arc fault detection. To realize what is described in FIG. 4, a current transformer 610 as shown in FIG. 4 can be added and connected in the same fashion. The arc fault detection sensor 605 can be a current sensor, from which a high frequency signal is extracted to make a decision on arcing.

Figure 7:
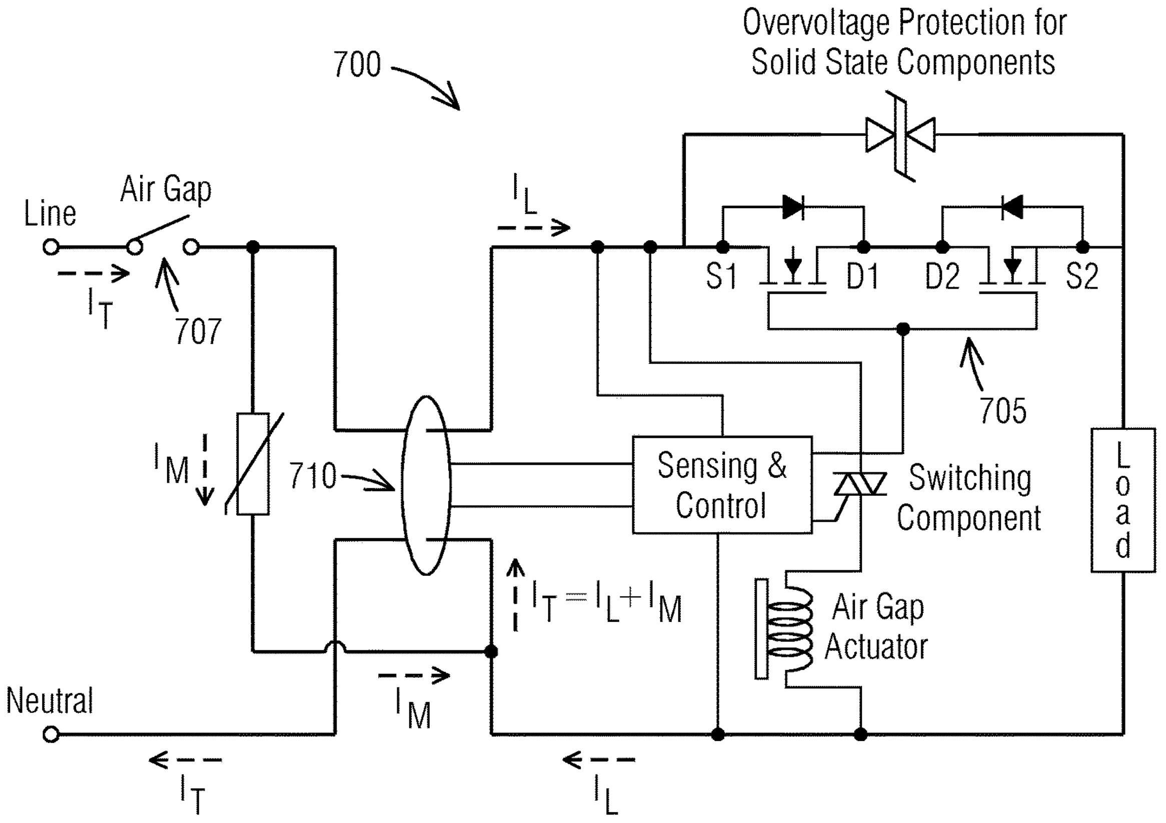
FIG. 7 illustrates a proposed solid-state circuit breaker construction in accordance with an exemplary embodiment of the present invention.

In FIG. 7, it illustrates a solid-state circuit breaker 700 in accordance with an exemplary embodiment of the present invention. For the solid-state circuit breaker 700, a set of solid-state switching components 705 are added to the current path and can interrupt the current independent of an air gap 707. To realize what is described in FIG. 4, a current transformer 710 is also added as in FIG. 4.

Figure 8:
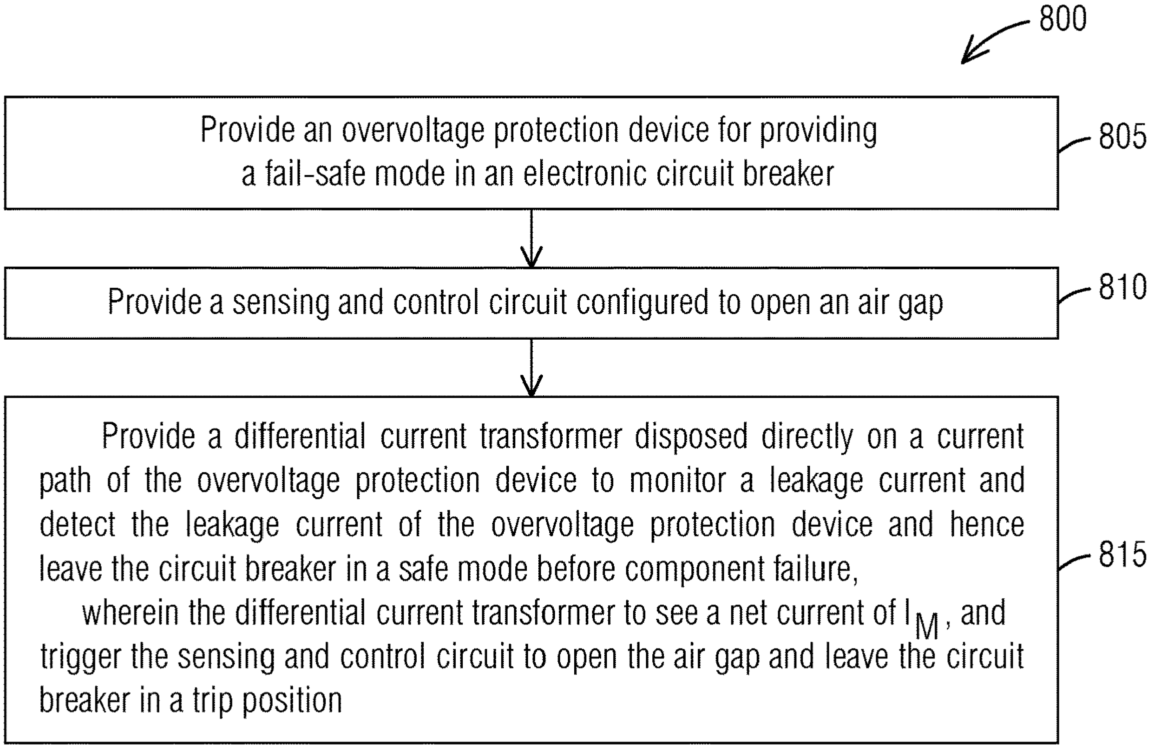
FIG. 8 illustrates a schematic view of a flow chart of a method of providing a fail-safe mode in an electronic circuit breaker in accordance with an exemplary embodiment of the present invention.

With regard to FIG. 8, it illustrates a schematic view of a flow chart of a method 800 of providing a fail-safe mode in an electronic circuit breaker in accordance with an exemplary embodiment of the present invention. Reference is made to the elements and features described in FIGS. 1-7. It should be appreciated that some steps are not required to be performed in any particular order, and that some steps are optional.

The method 800 comprises a step 805 of providing an overvoltage protection device. The method 800 further comprises a step 810 of providing a sensing and control circuit configured to open an air gap. The method 800 further comprises a step 815 of providing a differential current transformer disposed directly on a current path of the overvoltage protection device to monitor a leakage current and detect the leakage current of the overvoltage protection device and hence leave the circuit breaker in a safe mode before component failure. The differential current transformer to see a net current of $I_M$, and trigger the sensing and control circuit to open the air gap and leave the circuit breaker in a trip position.

Figure 9:
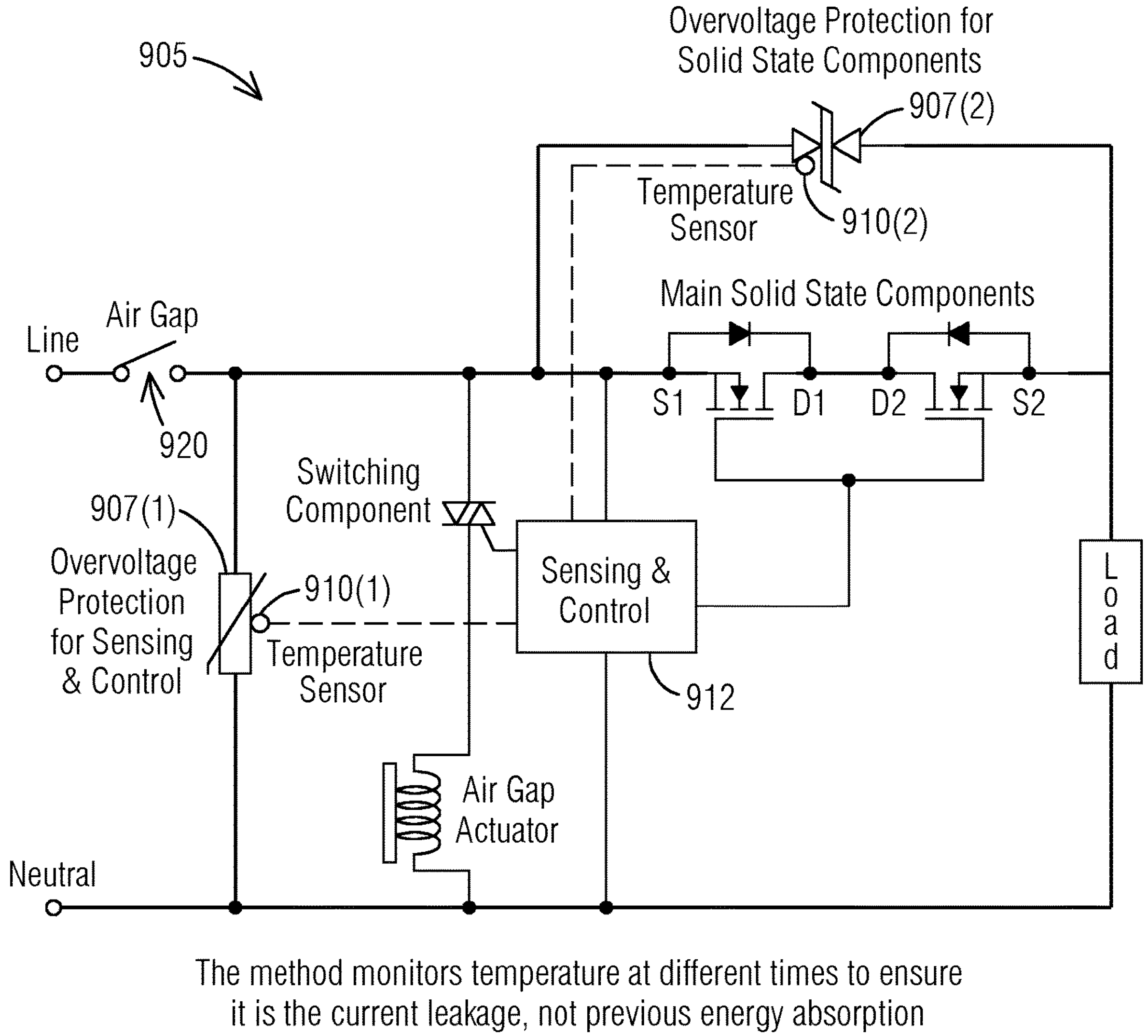
FIG. 9 illustrates an electronic circuit breaker (ECB) such as a solid-state circuit breaker (SSCB) with temperature sensors in accordance with an exemplary embodiment of the present invention.

With respect to FIG. 9, it illustrates an electronic circuit breaker (ECB) 905 such as a solid-state circuit breaker (SSCB) with temperature sensors in accordance with an exemplary embodiment of the present invention. The electronic circuit breaker (ECB) 905 is configured to provide a fail-safe mode. The electronic circuit breaker (ECB) 905 includes first and second overvoltage components 907(1-2). The electronic circuit breaker (ECB) 905 includes a temperature sensor 910(1-2) attached to each overvoltage component of the first and second overvoltage components 907(1-2). The electronic circuit breaker (ECB) 905 includes a sensing and control circuit 912 configured to monitor temperatures of the first and second overvoltage components 907(1-2). The sensing and the control circuit 912 uses the temperature sensors 910(1-2) to monitor if there is current running through, because the temperature sensors 910(1-2) run hot if that happens and the sensing and the control circuit 912 monitors temperature of the temperature sensors 910 (1-2) at start up at two different time moments before power electronics are turned on and if there's a temperature increase, one of overvoltage component of the first and second overvoltage components 907(1-2) is leaking.

There are two criteria to decide if the electronic circuit breaker 905 should open due to overvoltage component conditions, e.g., when either criterion is met. First, at any time when an air gap 920 is closed, if the temperature of the first and/or second overvoltage components 907(1-2) is higher than certain safe temperatures, the electronic circuit breaker 905 should open. Second, when the air gap 920 is first closed, monitor the temperature at time to and then monitor the temperature a delay later at t1, the temperatures of the first and/or second overvoltage components 907(1-2) should not increase and if temperature increases, current is flowing through a Metal-Oxide Varistor (MOV) or a Transient Voltage Suppressor (TVS) of the first and second overvoltage components 907(1-2), and it is an indicator of damaged component.

The electronic circuit breaker 905 may be a ground-fault circuit interrupter (GFCI) configured to shut off electric power in an event of a ground-fault. The electronic circuit breaker 905 may be an arc-fault circuit interrupter (AFCI) configured to detect a wide range of arcing electrical faults to help reduce an electrical system from being an ignition source of a fire.

The electronic circuit breaker (ECB) 905 replaces traditional moving parts of an electromechanical circuit breaker with semiconductors and advanced software algorithms that control power and can interrupt extreme currents faster. In the electronic circuit breaker 905, an overvoltage component of the first and/or second overvoltage components 907(1-2) is a Metal-Oxide Varistor (MOV) or a Transient Voltage Suppressor (TVS). When the overvoltage component of the first and/or second overvoltage components 907(1-2) starts to fail, the leakage current occurs at lower voltages and eventually leads to failure of components.

A monitoring method for overvoltage protection devices monitors temperature at different time to ensure it is the current leakage, not previous energy absorption. If the temperature of the first and second overvoltage components 907(1-2) is higher than certain safe temperatures, e.g. 120C. The electronic circuit breaker 905 monitors the temperature at time to and then monitor the temperature a delay later at t1, e.g. 1 sec later.

The sensing and the control circuit 912 uses the temperature sensors 910(1-2) attached to MOVs to monitor if there is current running through, because MOVs run hot if that happens there's a startup testing sequence where the sensing and the control circuit 912 monitors MOV temperature at start up at two different time moments before power electronics are turned on and if there's a temperature increase, the MOV is leaking, thus it is bad.

Figure 10:
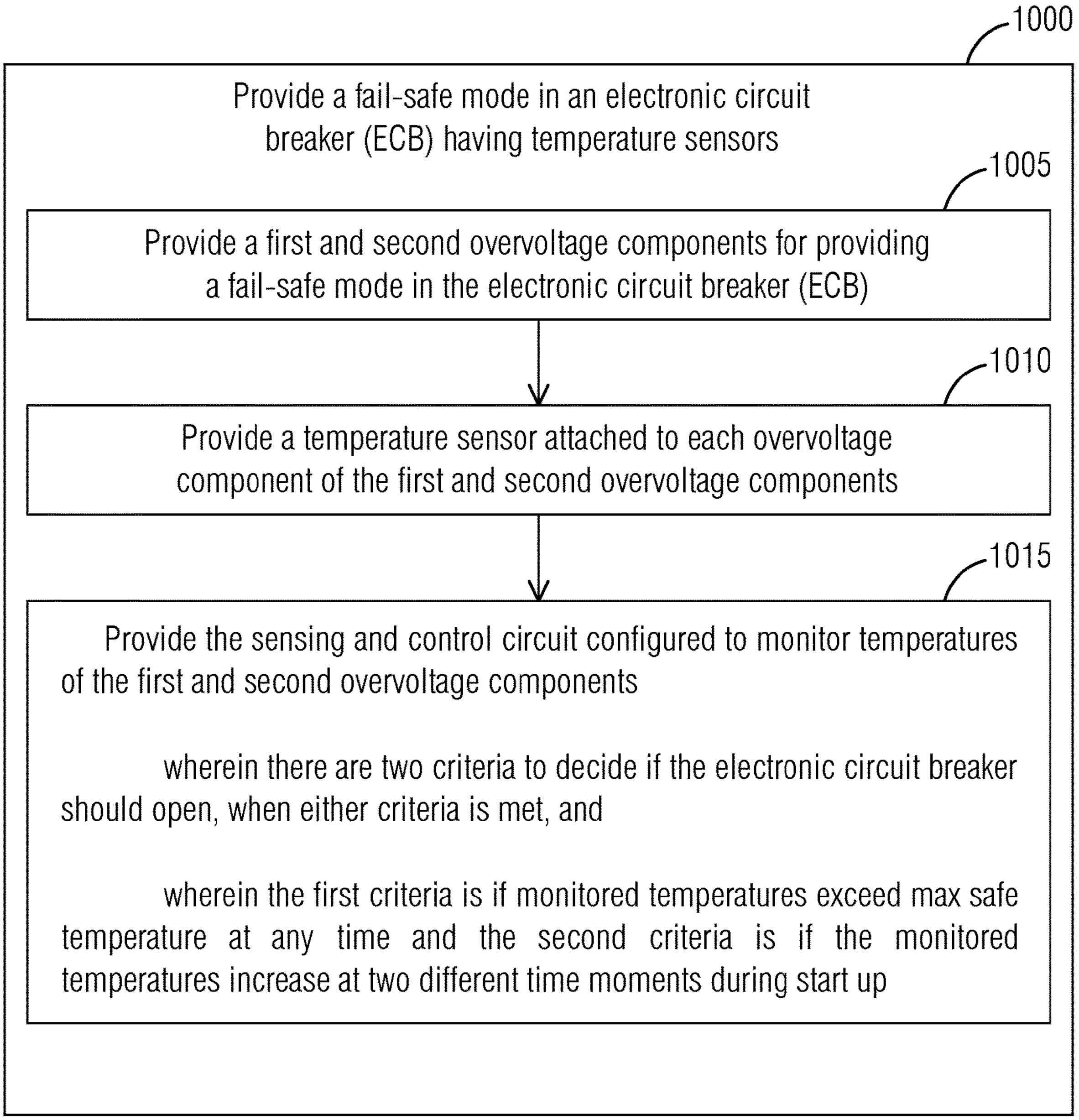
FIG. 10 illustrates a schematic view of a flow chart of a method of providing a fail-safe mode in an electronic circuit breaker having temperature sensors in accordance with an exemplary embodiment of the present invention.

FIG. 10 illustrates a schematic view of a flow chart of a method 1000 of providing a fail-safe mode in an electronic circuit breaker having temperature sensors in accordance with an exemplary embodiment of the present invention. Reference is made to the elements and features described in FIG. 9. It should be appreciated that some steps are not required to be performed in any particular order, and that some steps are optional.

The method 1000 comprises a step 1005 of providing first and second overvoltage components for providing a fail-safe mode in the electronic circuit breaker (ECB) 905. The method 1000 further comprises a step 1010 of providing a temperature sensor attached to each overvoltage component of the first and second overvoltage components.

The method 1000 further comprises a step 1015 of providing the sensing and control circuit 912 configured to monitor temperatures of the first and second overvoltage components 907(1-2). There are two criteria to decide if the solid-state circuit breaker should open due to overvoltage component conditions, e.g., when either criterion is met.

The sensing and the control circuit 912 uses the temperature sensors to monitor if there is current running through, because the temperature sensors run hot if that happens and the sensing and the control circuit 912 monitors temperature of the temperature sensors at start up at two different time moments before power electronics are turned on and if there's a temperature increase, one of overvoltage component of the first and second overvoltage components is leaking.

While a design of three circuit breakers (AFCI, GFCI, Solid-State) is described here a range of one or more other circuit breakers are also contemplated by the present invention. For example, other circuit breakers may be implemented based on one or more features presented above without deviating from the spirit of the present invention.

The techniques described herein can be particularly useful for an overvoltage protection device such as a clamping device. While particular embodiments are described in terms of the clamping device, the techniques described herein are not limited to such devices but can also be used with other overvoltage protection devices.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An electronic circuit breaker (ECB) configured to provide a fail-safe mode, comprising:
- at least one overvoltage component;
- a temperature sensor attached to the at least one overvoltage component; and
- a sensing and control circuit configured to monitor temperatures of the at least one overvoltage component,
- wherein the electronic circuit breaker is configured to open in response to meeting one out of two criteria, and
- wherein a first criterion comprises monitored temperatures that exceed max safe temperature at any time and a second criterion comprises that the monitored temperatures increase at two different time moments during start up.

2. The electronic circuit breaker of claim 1, wherein the electronic circuit breaker is a ground-fault circuit interrupter (GFCI) configured to shut off electric power in an event of a ground-fault.

3. The electronic circuit breaker of claim 1, wherein the electronic circuit breaker is an arc-fault circuit interrupter (AFCI) configured to detect arcing electrical faults to help reduce an electrical system from being an ignition source of a fire.

4. The electronic circuit breaker of claim 1, wherein the electronic circuit breaker (ECB) replaces traditional moving parts of an electromechanical circuit breaker with semiconductors and advanced software algorithms.

5. The electronic circuit breaker of claim 1, wherein the at least one overvoltage component comprises a first overvoltage component and a second overvoltage component, wherein the first and second overvoltage components is a Metal-Oxide Varistor (MOV) or a Transient Voltage Suppressor (TVS).

6. The electronic circuit breaker of claim 5, wherein, when the first overvoltage component and the second overvoltage component start to fail, a leakage current occurs at lower voltages and leads to failure of components.

7. The electronic circuit breaker of claim 1, wherein a monitoring method for the at least one overvoltage protection component monitors temperature at different times to ensure that the electronic circuit breaker opens based on current leakage without previous energy absorption.

8. A method of providing a fail-safe mode in an electronic circuit breaker (ECB), the method comprising:
- providing at least one overvoltage component;
- providing a temperature sensor attached to the at least one overvoltage component; and
- providing a sensing and control circuit configured to monitor temperatures of the at least one overvoltage component,
- wherein the electronic circuit breaker is configured to open in response to meeting one out of two criteria, and
- wherein a first criterion comprises that monitored temperatures exceed max safe temperature at any time and a second criterion comprises that the monitored temperatures increase at two different time moments during start up.

9. The method of claim 8, wherein the electronic circuit breaker is a ground-fault circuit interrupter (GFCI) configured to shut off electric power in an event of a ground-fault.

10. The method of claim 8, wherein the electronic circuit breaker is an arc-fault circuit interrupter (AFCI) configured to detect arcing electrical faults to help reduce an electrical system from being an ignition source of a fire.

11. The method of claim 8, wherein the electronic circuit breaker (ECB) replaces traditional moving parts of an electromechanical circuit breaker with semiconductors and software algorithms.

12. The method of claim 8, wherein the at least one overvoltage component comprises a first overvoltage component and a second overvoltage component, wherein the first and second overvoltage components is a Metal-Oxide Varistor (MOV) or a Transient Voltage Suppressor (TVS).

13. The method of claim 12, wherein, when the first overvoltage component and the second overvoltage component start to fail, a leakage current occurs at lower voltages and leads to failure of components.

* * * * *